(12) United States Patent
Nakao et al.

(10) Patent No.: US 7,079,594 B2
(45) Date of Patent: Jul. 18, 2006

(54) RECEIVING METHOD AND RECEIVING APPARATUS

(75) Inventors: Seigo Nakao, Gifu (JP); Nobuo Higashida, Moriguchi (JP)

(73) Assignees: Sanyo Electric Co., Ltd., Osaka (JP); NTT Data Sanyo System Corporation, Osaka (JP)

( * ) Notice: Subject to any disclaimer, the term of this patent is extended or adjusted under 35 U.S.C. 154(b) by 0 days.

(21) Appl. No.: 11/017,671

(22) Filed: Dec. 22, 2004

(65) Prior Publication Data

US 2005/0141647 A1   Jun. 30, 2005

(30) Foreign Application Priority Data

Dec. 26, 2003   (JP)   ............... 2003-432119

(51) Int. Cl.
   *H04L 27/06*   (2006.01)
(52) U.S. Cl. ............ 375/316; 375/147; 375/347; 455/137
(58) Field of Classification Search ............ 375/316, 375/147, 324, 347, 267; 455/132, 133, 137
   See application file for complete search history.

(56) References Cited

U.S. PATENT DOCUMENTS

2005/0053123 A1 *   3/2005   Higuchi et al. ............. 375/148

FOREIGN PATENT DOCUMENTS

JP   2002-026788 A   1/2002

* cited by examiner

*Primary Examiner*—Temesghen Ghebretinsae
(74) *Attorney, Agent, or Firm*—McDermott Will & Emery LLP (57) ABSTRACT

An antenna selector selects one antenna during an interval of control signal. A receiving weight vector computing unit computes receiving weight vectors. During an interval of data signal, a multiplier in a signal processing unit weights digital received signals with the receiving weight vectors so as to output composite signals. During an interval of control signal, a switch selects an output signal from the antenna selector as an output signal from a signal processing unit whereas during the interval of data signal it selects the composite signal. A carrier control unit outputs carrier recovered by a carrier recovery unit. A multiplier in a modem unit multiplies signal-processing-output-unit signals by signals from the carrier control unit.

20 Claims, 8 Drawing Sheets

RECEIVING METHOD AND RECEIVING APPARATUS

BACKGROUND OF THE INVENTION

1. Field of the Invention

The present invention relates to receiving technologies, and it particularly relates to method and apparatus for receiving signals by a plurality of antennas.

2. Description of the Related Art

In wireless communication, it is generally desired that the limited frequency resources be used effectively. Adaptive array antenna technology is one of the technologies that effectively utilize the frequency resources. In adaptive array antenna technology, the amplitude and phase of signals transmitted from and received by a plurality of antennas, respectively, are so controlled as to form a directional pattern of the antenna. In other words, the apparatuses provided with adaptive array antennas change respectively the amplitude and phase of signals received by the plurality of antennas, add up respectively a plurality of the thus changed received signals, and receive the signals equivalent to the signals received by the antenna having the directional pattern corresponding to the variation in said amplitude and phase (hereinafter referred to as "weight"). In addition, signals are transmitted in a directional pattern of the antenna corresponding to the weight.

One example of processings to compute the weights in adaptive array antenna technology is a processing based on the MMSE (Minimum Mean Square Error) method. In the MMSE method, the Wiener solution is known to be the condition for an optimum weight value. Also known is a recurrence formula whose amount of calculation is smaller than directly solving the Wiener solution. For such recurrence formula, adaptive algorithms, such as RLS (Recursive Least Squares) algorithm and LMS (Least Mean Squares) algorithm, are used. The RLS algorithm generally converges faster, but the computation therefor is complicated, thus requiring high-speed arithmetic circuits or large-scale arithmetic circuits. Though the LMS algorithm can be realized with arithmetic circuits which are simpler than those for the RLS algorithm, the convergence speed thereof is low (See Reference (1) in the following Related Art List, for instance).

Related Art List (1) Japanese Patent Application Laid-Open No. 2002-26788.

When the adaptive array antennas are used for the radio mobile station, it is desirable that the arithmetic circuit be of a small size. Thus, the use of the LMS algorithm is appropriate for the updating of the weighting factors. However, the LMS algorithm generally converges slowly. Thus, if the received signals to be combined or synthesized are to be delayed until they converge, the processing delay will be accumulated. Accordingly, real-time processed applications, such as those for video conference, where permissible delay time is constrained to a certain time period may not be used. On the other hand, if the weighting factors at a stage where the LMS algorithm has not converged are used to carry out the receiving processing, then the receiving characteristics will generally be deteriorated.

SUMMARY OF THE INVENTION

The present invention has been made in recognition of the foregoing circumstances and an object thereof is to provide a receiving apparatus having a simple arithmetic circuit whose processing delay is small. Another object thereof is to provide a receiving apparatus in which the degradation in the receiving characteristics is small even if the weighting factors have not converged. Still another object thereof is to provide a receiving apparatus capable of smoothly switching a plurality of different types of weighting factors.

A preferred embodiment according to the present invention relates to a receiving apparatus. This apparatus includes: an input unit which respectively inputs a plurality of signals; a weighting factor deriving unit which derives a plurality of weight factors corresponding respectively to the plurality of inputted signals, based on the plurality of signals inputted by the input unit; a carrier recovery unit which recovers, over a first predetermined period, a carrier from one of the plurality of inputted signals; a synthesis unit which weights and synthesizes, over a second period that follows the first period, the plurality of inputted signals by the plurality of weighting factors derived by the weighting factor deriving unit; and a demodulation unit which generates and outputs, during the first period, a demodulated signal by one of the plurality of inputted signals and the recovered carrier and which outputs, during the second period, the synthesized signal as a demodulated signal.

By employing the above apparatus, in the first period the demodulated signal is generated from a single received signal and the recovered carrier whereas in the second period the synthesized signal is outputted as a demodulated signal, as it is, without the recovered carrier being operated thereto. Thus, the continuity of demodulated signals is kept.

A plurality of signals inputted to the input unit are signals which are contained in a single frame, and the first period may correspond to a period started from the top of said frame. Modulation scheme may differ in the first period and the second period that are to contain the plurality of signals inputted to the input unit. And the error tolerance in the modulation scheme in the first period may be higher than that in the second period. A period in which it takes for a plurality of weighting factors to be derived by the weighting factor deriving unit to reach a predetermined reference may be defined as the first period.

The "error tolerance" indicates the degree of the deterioration in transmission quality against the increase in noise or the like. For example, in the case of a relationship between bit error rate (BER) and signal-power-to-noise-power ratio (SNR), the error tolerance is said to be higher if less BER degradation results with the decreased SNR.

The "predetermined reference" is a reference by which it is determined that a plurality of weighting factors have been obtained to a certain degree. For example, a threshold value for error serves this purpose.

Another preferred embodiment according to the present invention relates to a receiving method. This method is such that in a first period a plurality of weighting factors are derived from a plurality of inputted signals, a carrier is recovered from one of the plurality of inputted signals so as to generate and output a demodulated signal from the one of the plurality of inputted signals and the recovered carrier, then in a second period that follows the first period the plurality of inputted signals are weighted respectively with the plurality of derived weighting factors and then synthesized, and the synthesized signals are outputted as demodulated signals.

Still another preferred embodiment according to the present invention relates also to a receiving method. This method comprises: inputting respectively a plurality of signals; deriving a plurality of weight factors corresponding respectively to the plurality of inputted signals, based on the plurality of inputted signals; recovering, over a first predetermined period, a carrier from one of the plurality of inputted signals; weighting and synthesizing, over a second period that follows the first period, the plurality of inputted signals by the plurality of derived weighting factors; and generating and outputting, during the first period, a demodulated signal by one of the plurality of inputted signals and the recovered carrier and outputting, during the second period, the synthesized signal as a demodulated signal.

A plurality of inputted signals are signals which are contained in a single frame, and the first period may correspond to a period started from the top of said frame. Modulation scheme may differ in the first period and the second period that are to contain the plurality of inputted signals. And the error tolerance in the modulation scheme in the first period may be higher than that in the second period. A period in which it takes for a plurality of weighting factors to be derived by the deriving to reach a predetermined reference may be defined as the first period.

Still another preferred embodiment according to the present invention relates to a program. This program, executable by a computer, includes the functions of: inputting respectively a plurality of signals via a wireless network; deriving a plurality of weight factors corresponding respectively to the plurality of inputted signals, based on the plurality of inputted signals, and storing the plurality of derived weight factors in a memory; recovering, over a first predetermined period, a carrier from one of the plurality of inputted signals; weighting and synthesizing, over a second period that follows the first period, the plurality of inputted signals by the plurality of weighting factors stored in the memory; and generating and outputting, during the first period, a demodulated signal by one of the plurality of inputted signals and the recovered carrier and outputting, during the second period, the synthesized signal as a demodulated signal.

A plurality of inputted signals are signals which are contained in a single frame, and the first period may correspond to a period started from the top of said frame. Modulation scheme may differ in the first period and the second period that are to contain the plurality of inputted signals. And the error tolerance in the modulation scheme in the first period may be higher than that in the second period. A period in which it takes for a plurality of weighting factors to be derived by the deriving to reach a predetermined reference may be defined as the first period.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

Before describing the present invention in a specific manner, the outline will be first described. The embodiments according to the present invention relate to a base station apparatus which carries out wireless communication with a terminal apparatus, and the base station apparatus carries out adaptive array processing for a plurality of signals received by a plurality of antennas. Signals transmitted from a terminal apparatus to a base station apparatus form burst signals, and a control signal modulated by BPSK (Binary Phase Shift Keying) is placed in the top portion of the burst signal. In a position following the control signal, a data signal modulated by 16QAM (Quadrature Amplitude Modulation) is placed. In a base station apparatus according to the present embodiments, when the burst signals are received by a plurality of antennas, receiving weight vectors necessary for the adaptive array processing are estimated by the LMS algorithm over a period during which the burst signals are received.

Over a period of control signal, one of a plurality of antennas is selected to receive burst signals and with the thus selected antenna the received signals are subjected to coherent detection. At this time, carrier recovery necessary for the coherent detection is also done based on the signals received by the selected antenna. The signals which have been subjected to coherent detection are decided and outputted. On the other hand, over a period of data signal, a plurality of signals received by a plurality of antennas are subjected to adaptive array processing based on the estimated receiving weight vectors. The signals which have been subjected to adaptive array processing are decided and outputted. In general, the signals received by the selected antenna and the signals which have been subjected to adaptive array signal processing do not have the identical in-phase axis and quadrature axis. Thus the continuity is not retained among these signals. Here, only the signals received by the selected antenna are subjected to coherent detection in order to retain the continuity. That is, the signals which have been subjected to coherent detection and those which have been subjected to adaptive array processing have the same in-phase axis and quadrature axis, so that changing only the amplitude reference makes it possible to process the control signal and the data signal continuously in the case of making decisions.

Figure 1:
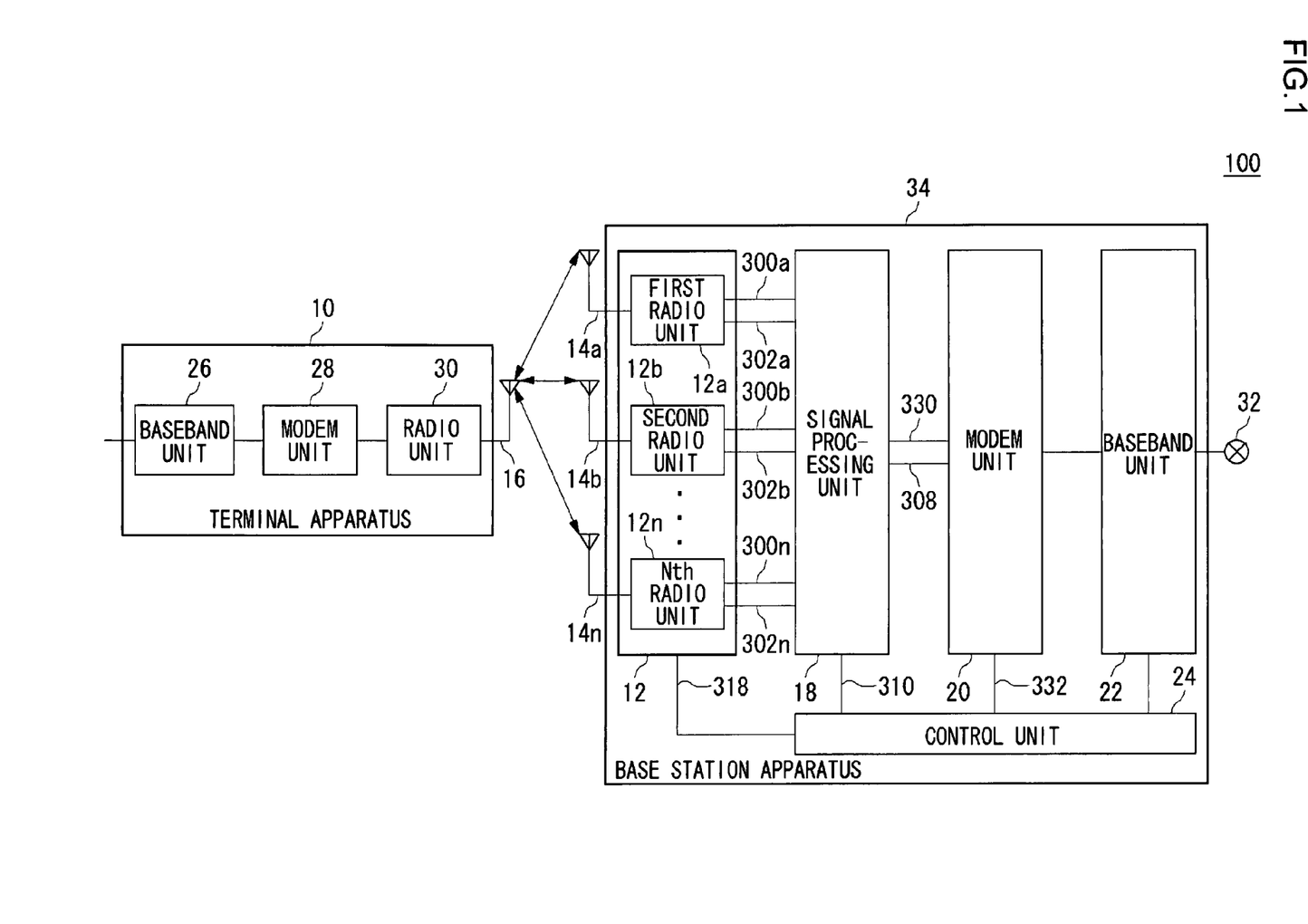
FIG. 1 shows a structure of a communication system according to an embodiment of the present invention.

FIG. 1 shows a structure of a communication system 100 according to an embodiment of the present invention. The communication system 100 includes a terminal apparatus 10, a base station apparatus 34 and a network 32. The terminal apparatus 10 includes a baseband unit 26, a modem unit 28, a radio unit 30 and an antenna 16 for use with terminal apparatus. The base station apparatus 34 includes a first basestation antenna 14a, a second basestation antenna 14b, . . . and an Nth basestation antenna 14n, which are generically called antennas 14 for use with base station apparatus, a first radio unit 12a, a second radio unit 12b, . . . and an Nth radio unit 12n, which are generically called radio units 12, a signal processing unit 18, a modem unit 20, a baseband unit 22 and a control unit 24. Moreover, the base station apparatus 16 includes as signals a first digital received signal 300a, a second digital received signal 300b, . . . and an Nth digital received signal 300n, which are generically called digital received signals 300, a digital transmitted signal 302a, a second digital transmitted signal 302b, . . . and an Nth digital transmitted signal 302n, which are generically called digital transmitted signals 302, a signal processor output signal 330, a pre-separation signal 308, a signal processor control signal 310, a radio-unit control signal 318 and a modem-unit control signal 332.

The baseband unit 22 in the base station apparatus 34 is an interface with the network 32. The baseband unit 26 in the terminal apparatus 10 is an interface with a PC connected to a terminal apparatus 10 or with an application inside the terminal apparatus 10. The baseband units 22 and 26 perform their respective transmission/receiving processings of information signals to be transmitted from and received by the communication system 100. The baseband units 22 and 26 may also carry out error correction or automatic retransmission processing, but the description of such processings is omitted here.

The modem unit 20 in the base station apparatus 34 and the modem unit 28 in the terminal apparatus 10 modulate, as a modulation processing, carrier with information signals and generate signals to be transmitted. The modem units 20 and 28 also demodulate, as a demodulation processing, received signals and reproduce the transmitted information signals.

The signal processing unit 18 performs a signal processing necessary for a transmission/receiving processing of adaptive array antennas.

The radio units 12 in the base station apparatus 34 and the radio unit 30 in the terminal apparatus 10 carry out frequency conversion processing, amplification processing, A-D or D-A conversion processing and the like between baseband signals and radio frequency signals, which are processed by the signal processing unit 18, the modem unit 20, the baseband unit 22, baseband unit 26 and the modem unit 28.

The basestation antennas 14 in the base station apparatus 34 and the terminal antenna 16 in the terminal apparatus 10 perform transmission/receiving processings on radio frequency signals. The directivity of the respective antennas may be arbitrary and the number of basestation antennas 14 is denoted by N.

The control unit 24 controls timings for the radio unit 12, the signal processing unit 18, the modem unit 20 and the baseband unit 22, or channel allocation.

Figure 2:
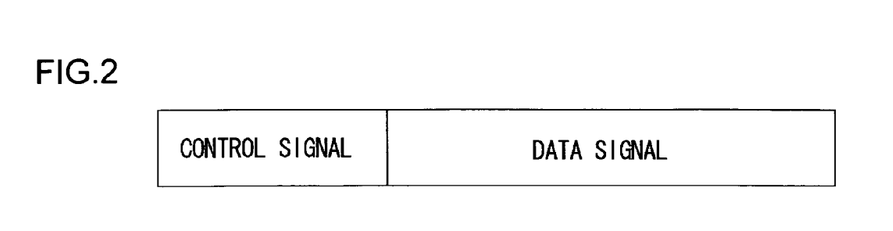
FIG. 2 shows a structure of a burst format according to the present embodiments.

FIG. 2 shows a structure of a burst format according to the present embodiment. A burst signal is such that a control signal is placed in the top portion of the burst format and a data signal is placed in the subsequent portion thereof. It is assumed here that the control signal contains also a preamble signal or a training in addition to signals necessary for controlling communication between the terminal apparatus 10 and the base station apparatus 34. The data signal, on the other hand, corresponds to information to be transmitted and the like. As described earlier, the control signal is modulated by BPSK whereas the data signal is modulated by 16QAM.

Figure 3:
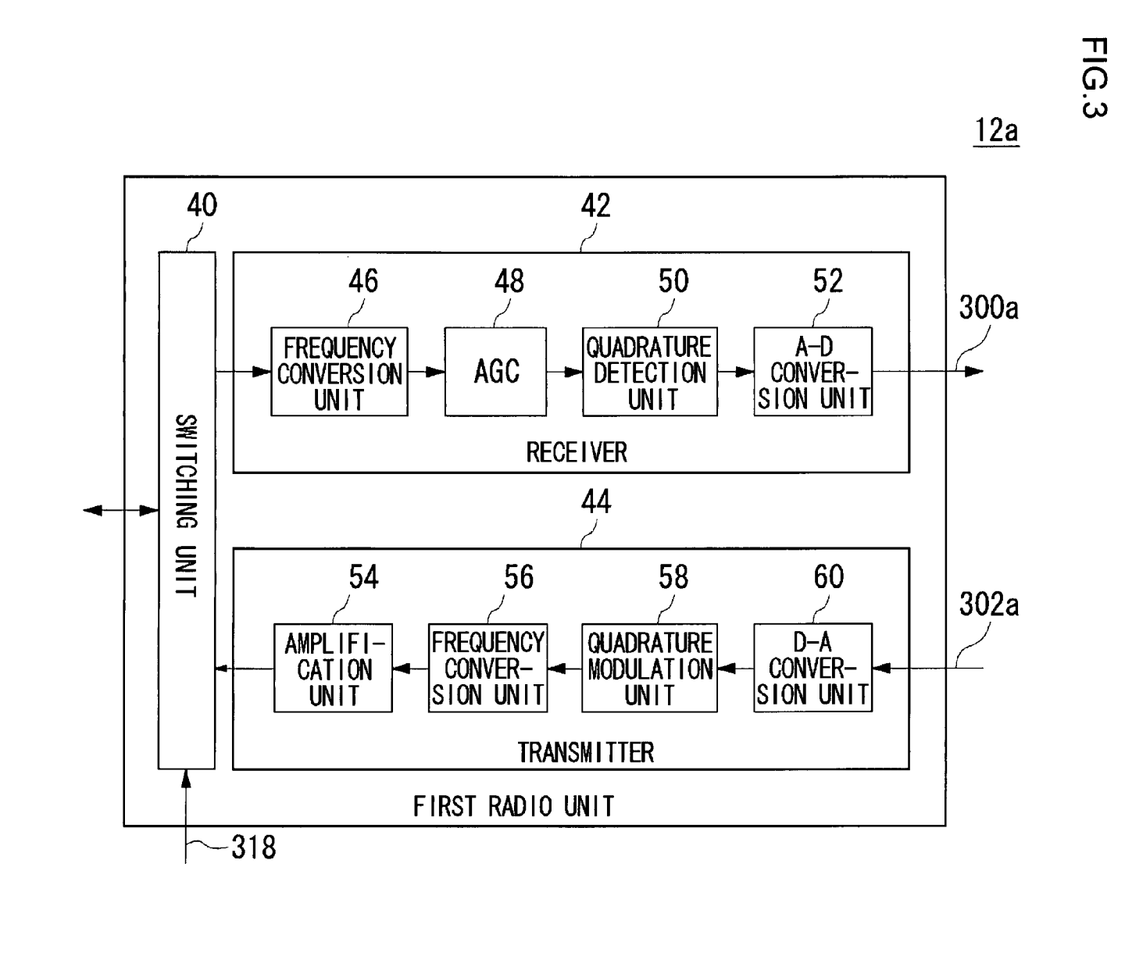
FIG. 3 shows a structure of the first radio unit shown in FIG. 1.

FIG. 3 shows a structure of a first radio unit 12a. The first radio unit 12a includes a switching unit 40, a receiver 42 and a transmitter 44. The receiver 42 includes a frequency conversion unit 46, an AGC (Automatic Gain Control) 48, a quadrature detection unit 50, an A-D conversion unit 52. The transmitter 44 includes an amplification unit 54, a frequency conversion unit 56, a quadrature modulation unit 58, a D-A conversion unit 60.

The switching unit 40 switches input and output of signals to the receiver 42 and the transmitter 44 according to radio-unit control signals 318 from the control unit 24 (not shown in FIG. 3). That is, the switching unit 40 selects the signals from the transmitter 44 at the time of transmission whereas it selects the signals to the receiver 42 at the time of receiving.

The frequency conversion unit 46 in the receiver 42 and the frequency conversion unit 56 in the transmitter 44 perform frequency conversion on targeted signals between radio frequencies and intermediate frequencies. Though not shown here, a frequency oscillator is provided for each of the radio units 12 to carry out the frequency conversions at the frequency conversion unit 46 and the frequency conversion unit 56, so that a plurality of frequency oscillators are provided for a plurality of radio units 12. The plurality of frequency oscillators operate independently from one other.

The AGC 48 controls gain automatically to make the amplitude of a received signal an amplitude within the dynamic range of the A-D conversion unit 52.

The quadrature detection unit 50 generates baseband analog signals by performing quadrature detection on intermediate frequency signals. On the other hand, the quadrature modulation unit 58 generates intermediate-frequency signals by performing quadrature modulation on the baseband analog signals.

The A-D conversion unit 52 converts baseband analog signals to digital signals. The D-A conversion unit 60 converts baseband digital signals to analog signals.

The amplification unit 54 amplifies radio frequency signals to be transmitted.

Figure 4:
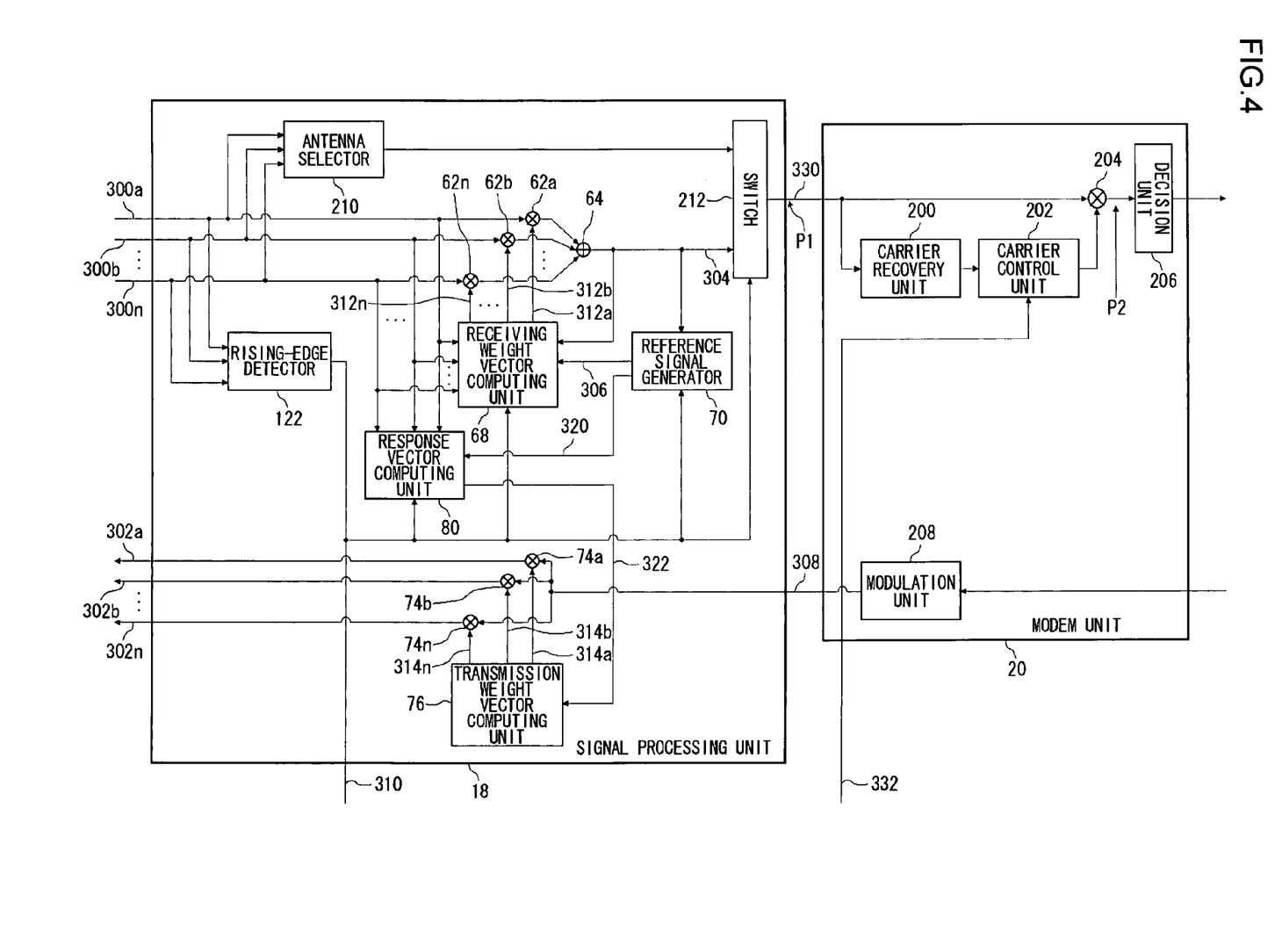
FIG. 4 shows a structure of the signal processing unit and modem unit shown in FIG. 1.

FIG. 4 shows a structure of signal processing unit 18 and modem unit 20. The signal processing unit 18 includes a first multiplier 62a, a second multiplier 62b, . . . and an Nth multiplier 62n, which are generically named multipliers 62, and an adder 64, a receiving weight vector computing unit 68, a reference signal generator 70, a first multiplier 74a, a second multiplier 74b, . . . and an Nth multiplier 74n, which are generically named multipliers 74, a transmission weight vector computing unit 76, a response vector computing unit 80, an antenna selector 210, a rising-edge detector 122 and a switch 212. The modem unit 20 includes a carrier recovery unit 200, a carrier control unit 202, a multiplier 204, a decision unit 206 and a modulation unit 208. Signals involved in the signal processing unit 18 include a composite signal 304, a weight reference signal 306, a first receiving weight vector 312a, a second receiving weight vector 312b, . . . and an Nth receiving weight vector 312n, which are generically named receiving weight vectors 312, a first transmission weight vector 314a, a second transmission weight vector 314b, . . . and an Nth transmission weight vector 314n, which are generically named transmission weight vectors 314, a response reference signal 320 and a response vector 322.

The rising-edge detector 122 detects from digital received signals 300 the head of a burst signal that triggers the operation of signal processing unit 18 and modem unit 20. The timing of the detected head of the burst signal is conveyed to the control unit 24 (not shown in FIG. 4) by the signal processor control signal 310. The control unit 24 calculates, from the head timing, the termination timing for an interval of control signal and notifies each unit of these timings, as the signal processor control signal 310 and the modem-unit control signal 332, according as necessity arises.

In order to select one basestation antenna 14 (not shown) which is to be enabled in an interval of control signal, the antenna selector 210 measures electric power of the digital received signals 300 respectively after the start of the interval of control signal and then determines a digital received signal 300 which has the maximum power. Then, the antenna selector 210 outputs this determined digital received signal 300.

Using LMS algorithm, the receiving weight vector computing unit 68 computes receiving weight vectors 312 necessary for weighting digital received signals 300 from the digital received signals 300, composite signal 304 and weight reference signal 306.

The multipliers 62 weight the digital received signals 300 with the receiving weight vectors 312 in the interval of data signal. The adder 64 sums up the outputs of the multipliers 62 and outputs the composite signal 304.

As an output signal from the signal processing unit 18, the switch 212 selects the output signal from the antenna selector 210 in the interval of control signal, selects the composite signal 304 in the interval of data signal and outputs the selected signal as the signal processor output signal 330.

During a training period, the reference signal generator 70 outputs a training signal stored in advance as a weight reference signal 306 and a response reference signal 320. After the training period, the composite signal 304 is compared to a predefined threshold value and then the result of the decision is outputted as a weight reference signal 306 and a response reference signal 320. The decision may not necessarily be a hard decision but it may also be a soft decision.

From the digital received signal 300 and the response reference signal 320, the response vector computing unit 80 computes the response vector 322 as a receiving response characteristic of a received signal against a transmitted signal. Though the method for computing the response vectors 322 may be arbitrary, a method carried out here is based on a correlation processing, for example, as will be explained hereunder. It is assumed herein that the digital received signals 300 and the response reference signals 320 are inputted not only from within the signal processing unit 18 but also from signal processing units corresponding to other user terminal apparatuses via signal lines, which are not shown here. If the digital received signal 300 corresponding to a first terminal apparatus is designated as $x_1(t)$, the digital received signal 300 corresponding to a second terminal apparatus as $x_2(t)$, the response reference signal 320 corresponding to the first terminal apparatus as $S_1(t)$ and the response reference signal 320 corresponding to the second terminal apparatus by $S_2(t)$, then $x_1(t)$ and $x_2(t)$ will be expressed by the following Equation (1):

$$x_1(t)=h_{11}S_1(t)+h_{21}S_2(t)$$

$$x_2(t)=h_{12}S_1(t)+h_{22}S_2(t) \quad (1)$$

where $h_{ij}$ is the response characteristic from an ith terminal apparatus to a jth basestation antenna $14j$, with noise ignored. A first correlation matrix $R_1$, with E as an ensemble average, is expressed by the following Equation (2):

$$R_1 = \begin{bmatrix} E[x_1 S_1^*] & E[x_2 S_1^*] \\ E[x_1 S_2^*] & E[x_2 S_2^*] \end{bmatrix} \quad (2)$$

A second correlation matrix $R_2$ for computing the correlation among the response reference signals 320 is given by the following Equation (3):

$$R_2 = \begin{bmatrix} E[S_1 S_1^*] & E[S_1^* S_2] \\ E[S_2 S_1^*] & E[S_2^* S_2] \end{bmatrix} \quad (3)$$

Finally, the first correlation matrix $R_1$ is multiplied by the inverse matrix of the second correlation matrix $R_2$ so as to obtain a response vector 322, which is expressed by the following Equation (4):

$$\begin{bmatrix} h_{11} & h_{12} \\ h_{21} & h_{22} \end{bmatrix} = R_1 R_2^{-1} \quad (4)$$

The transmission weight vector computing unit 76 estimates the transmission weight vector 314 necessary for weighting the pre-separation signal 308, from the receiving weight vector 312 or the response vector 322 that reflects receiving response characteristics. The method for estimating the transmission weight vectors 314 may be arbitrary. As a most simple method therefor, however, the receiving weight vector 312 or the response vector 322 may be used as it is. As another method, the receiving weight vector signal 312 or the response vector 322 may be corrected using a conventional technique while the Doppler frequency variation of a propagation environment caused by time difference in between a receiving processing and a transmission processing is taken into account. Here, the response vector 322 will be used, as it is, as the transmission weight vector 314.

The multipliers 74 weight the pre-separation signal 308 with the transmission weight vectors 314 respectively so as to output the digital transmitted signals 302. It is assumed herein that the timing in the above operation follows the signal processor control signal 310.

The carrier recovery unit 200 recovers carrier, in the interval of control signal, particularly from a preamble signal contained in the control signal. The method for recovering the carrier may be arbitrary, and the inverse modulation scheme, the multiply scheme, the Costas loop scheme or the like is used.

The carrier control unit 202 controls whether or not to output carrier recovered by the carrier recovery unit 200, based on the modem-unit control signal 332. Over the interval of control signal, the carrier control unit 202 outputs carrier recovered by the carrier recovery unit 200. Over the interval of data signal, on the other hand, the carrier control unit 202 outputs signals of in-phase components only, namely, those whose phase are not rotated by complex multiplication.

The multiplier 204 multiplies the signal processor signal 330 by a signal from the carrier control unit 202.

The decision unit 206 makes a decision on the signals outputted from the multiplier 204. The decision may not necessarily be a hard decision but it may also be a soft decision. Here, both the signals which have been subjected to coherent detection by carrier outputted from the carrier recovery unit 200 in the interval of control signal and the signals which have been subjected to the adaptive array processing by the receiving weight vector computing vector unit 68, multipliers 62 and adder 64 in the interval of data signal share the same in-phase axis and quadrature axis. Hence, the decision unit 206 makes a decision on the in-phase components and quadrature components of signals outputted from the multiplier 204 as they are. Moreover, since the control signal and data signal are each modulated by a different modulation scheme, the reference for the decision is changed accordingly.

The modulation unit 208 modulates information to be transmitted. The BPSK and 16 QAM are used here as the modulation scheme as shown in FIG. 2.

In terms of hardware, the above-described structure can be realized by a CPU, a memory and other LSIs of an arbitrary computer. In terms of software, it is realized by memory-loaded programs which have a reserved management function or the like, but drawn and described herein are function blocks that are realized in cooperation with those. Thus, it is understood by those skilled in the art that these function blocks can be realized in a variety of forms such as by hardware only, software only or the combination thereof.

Figure 5:
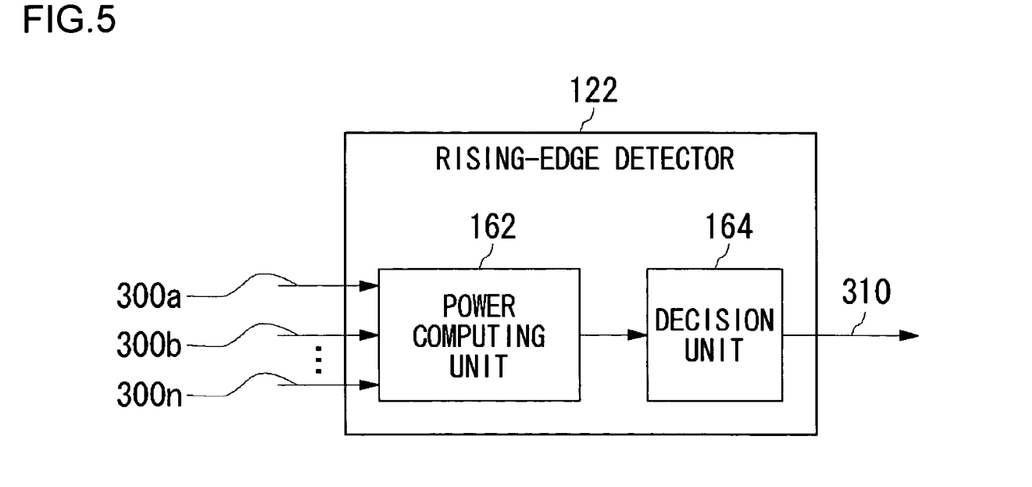
FIG. 5 shows a structure of the rising-edge detector shown in FIG. 1.

FIG. 5 shows a structure of a rising-edge detector 122. The rising-edge detector 122 includes a power computing unit 162 and a decision unit 164.

The power computing unit 162 computes the received power of the digital received signals 300 respectively and sums up these power values so as to obtain the electric power of signals received by all of the basestation antennas 14.

The decision unit 164 compares the received power with a predetermined condition and, if the condition is met, judges that the head of a burst signal has been detected. When detected, it is notified to the control unit 24, not shown, by the signal processor control signal 310.

Figure 6:
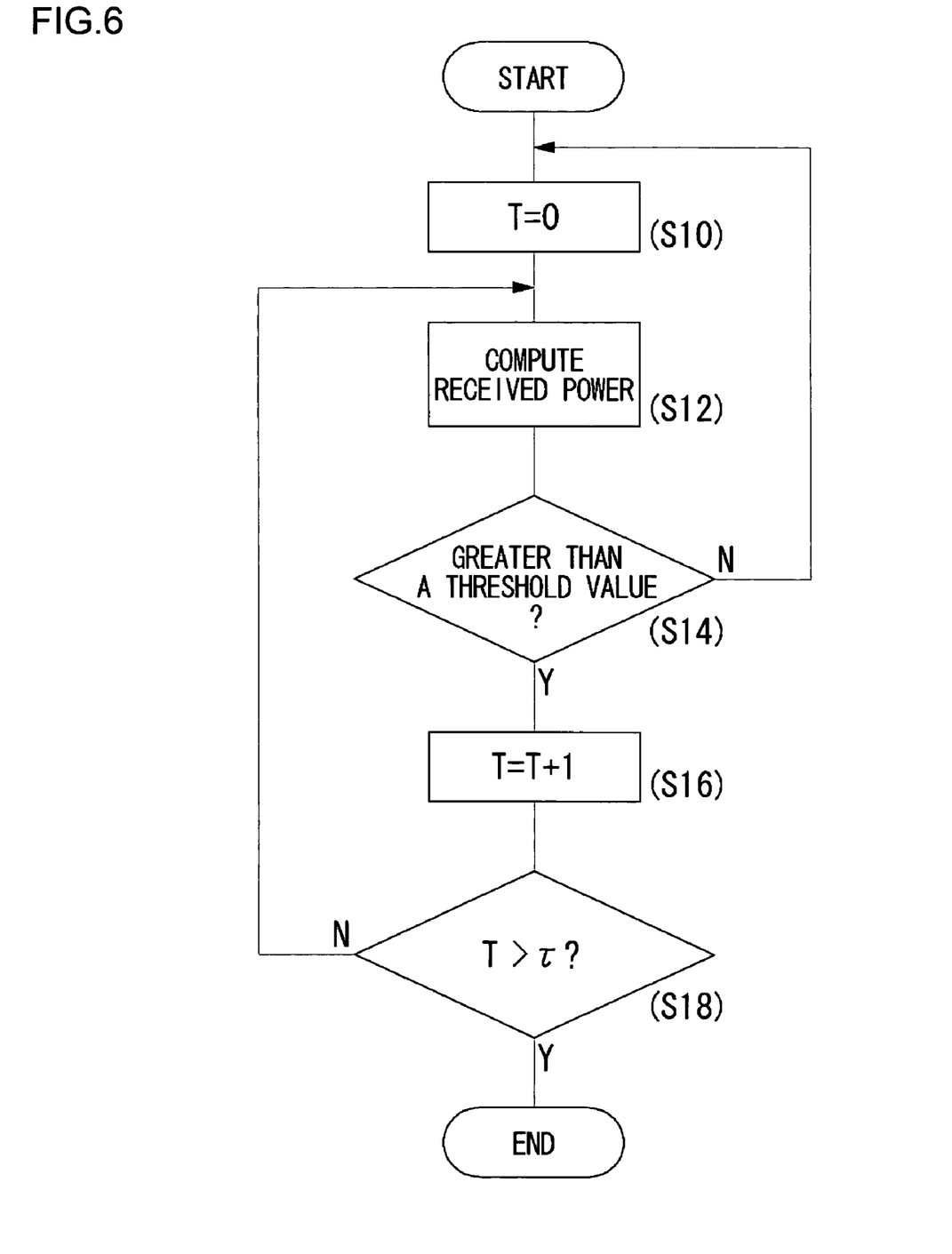
FIG. 6 is a flowchart showing an operational procedure of the rising-edge detector of FIG. 5.

FIG. 6 is a flowchart showing an operational procedure of a rising-edge detector 122. The decision unit 164 sets an internal counter T to "0". (S10). The power computing unit 162 computes received power from a digital received signal 300 (S12). The decision unit 164 compares the received power with a threshold value and, if it is greater than the threshold value (Y of S14), adds "1" to the counter T (S16). If T becomes greater than a prescribed value τ (Y of S18), it is judged that the head of a burst signal has been detected. Until the head of a burst is detected, the above processing will be repeated (N of S14, N of S18).

Figure 7:
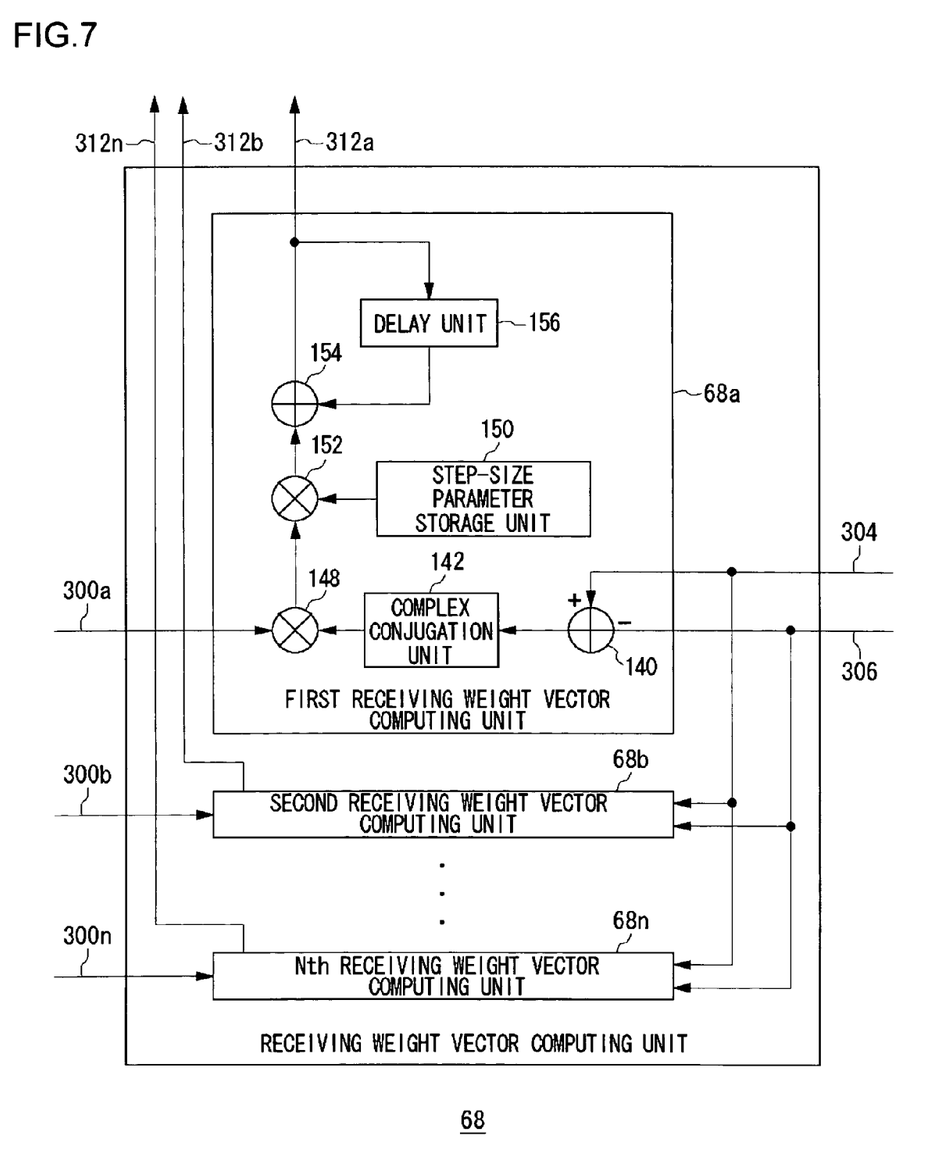
FIG. 7 shows a structure of the receiving weight vector computing unit of FIG. 4.

FIG. 7 shows a structure of receiving weight vector computing units 68. The receiving weight vector computing units 68 are a generically name given for a first receiving weight vector computing unit 68a, a second receiving weight vector computing unit 68b, . . . and an nth receiving weight vector computing unit 68n. Each of the receiving weight vector computing units 68 includes an adder 140, a complex conjugation unit 142, a multiplier 148, a step-size parameter storage unit 150, a multiplier 152, an adder 154 and a delay unit 156.

The adder 140 computes the difference between the composite signal 304 and the weight reference signal 306, and outputs an error signal, namely, an error vector. This error signal is subjected to a complex conjugation conversion by the complex conjugation unit 142.

The multiplier 148 multiplies the complex-conjugation-converted error signal by the first digital received signal 300a so as to generate a first multiplication result.

The multiplier 152 multiplies the first multiplication result by a step-size parameter stored in the step-size parameter storage unit 150 so as to generate a second multiplication result. The second multiplication result is subjected to a feedback by the delay unit 156 and the adder 154 and is then added with a new second multiplication result. In this manner, the result of addition updated successively by the LMS algorithm is outputted as a receiving weight vector 312.

Figure 8A:
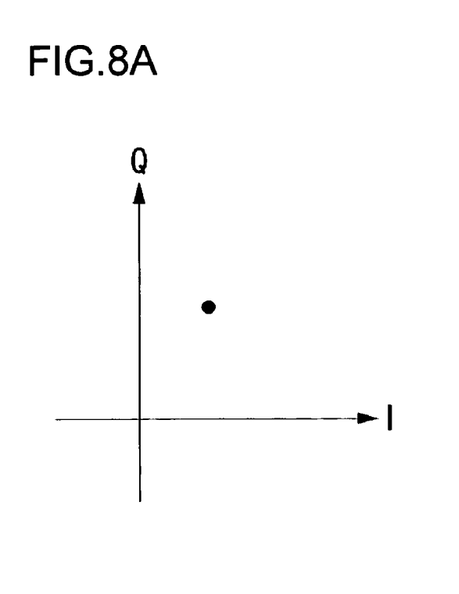
FIGS. 8A to 8D show signal constellations at the signal processing unit and modem unit of FIG. 4.
Figure 8B:
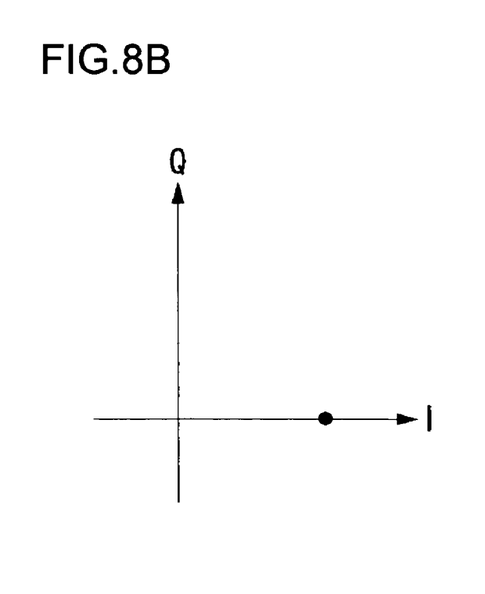

FIGS. 8A to 8D show signal constellations at the signal processing unit 18 and the modem unit 20. FIG. 8A shows the constellation of a signal processor output signal 330 at "P1" shown in FIG. 4 in an interval of control signal. This signal corresponds to a signal outputted from the antenna selector 210. Since it is before signals are subjected to coherent detection, this signal contains arbitrary phase components. In FIGS. 8A to 8D, "I" denotes the in-phase axis whereas "Q" denotes the quadrature axis. FIG. 8B shows the constellation of a signal outputted from the multiplier 204 shown in FIG. 4 at "P2" in the interval of control signal. Since this signal at "P2" is one that has been subjected to coherent detection, it is placed on the I axis.

Figure 8C:
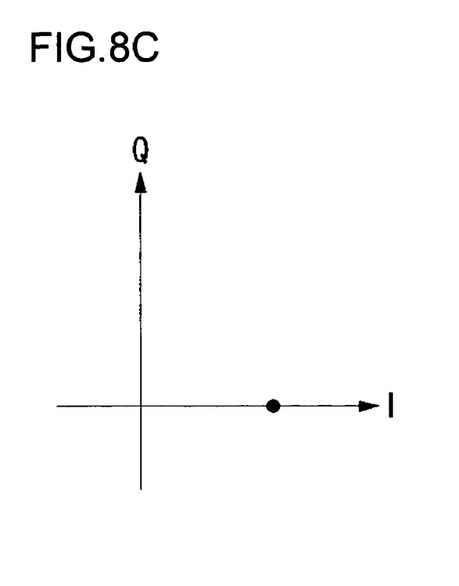
Figure 8D:
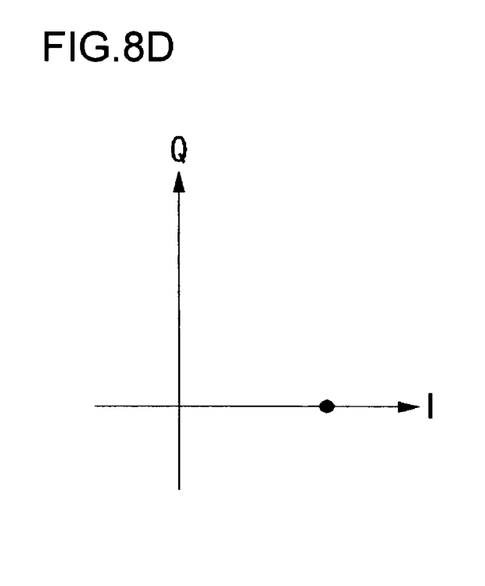

FIG. 8C shows the constellation of a signal processor output signal 330 at "P1" shown in FIG. 4 in an interval of data signal. Since this signal at "P2" is one that has been subjected to adaptive array signal processing in the receiving weight vector computing unit 68, the multiplier 62 and the adder 64, it is placed on the I axis. FIG. 8D shows the constellation of a signal outputted from the multiplier 204 shown in FIG. 4 at "P2" in the interval of data signal. Since at "P1" a signal point is already placed on the I axis, no processing is done in the multiplier 204. Thus, FIG. 8C and FIG. 8D show the same constellation.

In the interval of control signal the digital received signal 300 has an arbitrary phase, so that coherent detection is performed then. On the other hand, in the interval of data signal the composite signal 304 which has been subjected to adaptive array processing has the same phase plane as one obtained after coherent detection, so that coherent detection is not performed thereon then. By implementing such a processing, the decision unit 206 can process these signals on the same phase plane without being conscious of whether the signals are those received by a non-directional antenna or those received by an adaptive array antenna.

Figure 9:
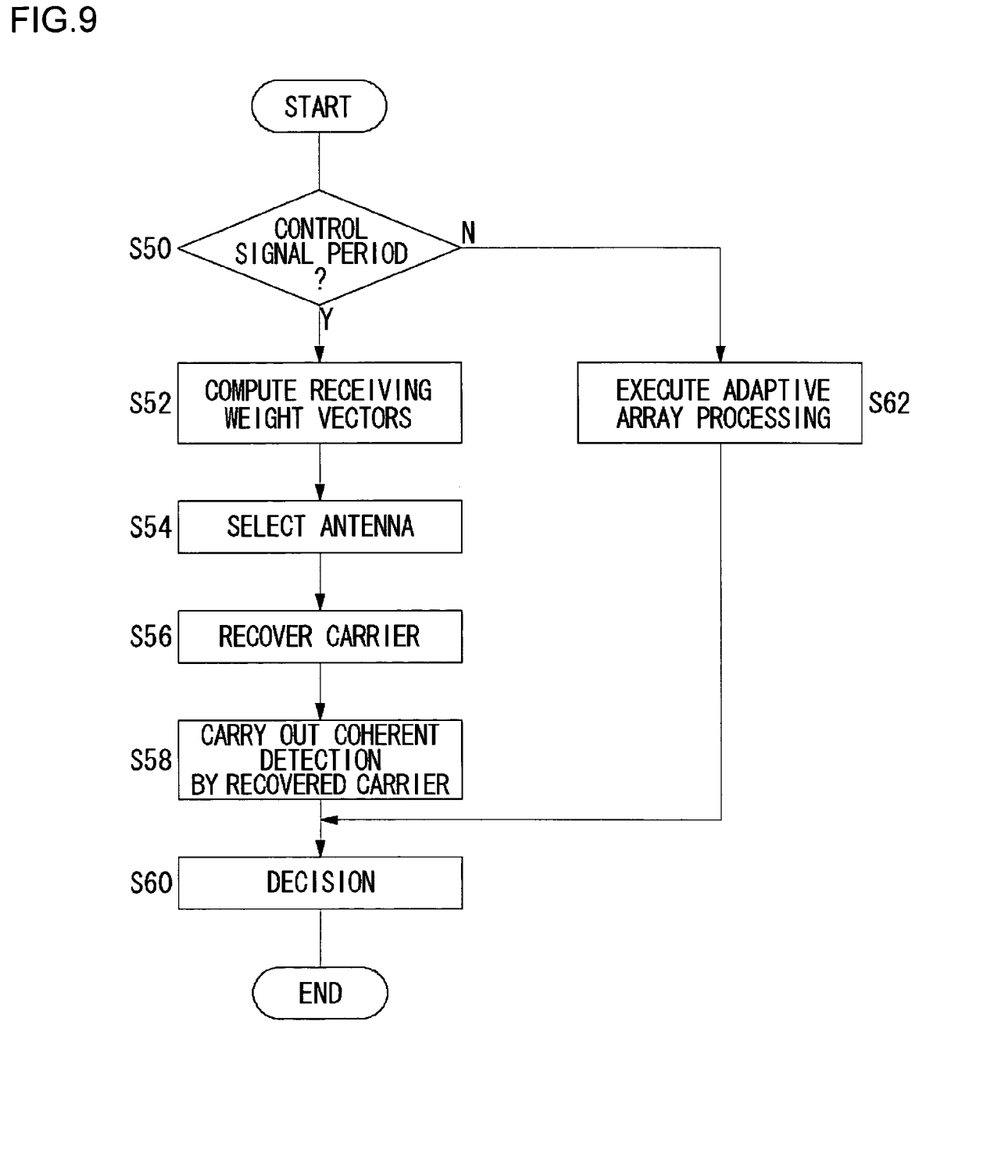
FIG. 9 is a flowchart showing an operational procedure of the base station apparatus shown in FIG. 1.

FIG. 9 is a flowchart showing an operational procedure of a base station apparatus 34. If the timing instructed by both signal processor control signal 310 and modem-unit control signal 332 outputted from the control unit 24 is during a period of control signal (Y of S50), the receiving weight vector computing unit 68 computes receiving weight vectors (S52). The antenna selector 210 selects, from among a plurality of digital received signals 300, digital received signals 300 corresponding to a single antenna (S54). The switch 212 outputs as signal processor output signal 330 as the digital received signals 300 selected by the antenna selector 210, and the carrier recovery unit 200 recovers carrier from the signal processor output signal 330 (S56). The carrier control unit 202 outputs, based on the modem-unit control signal 332, the carrier recovered by the carrier recovery unit 200, and the multiplier 204 performs coherent detection on the signal processor output signal 330 by the recovered carrier (S58). The decision unit 206 makes a decision on signals which have been subjected to coherent detection (S60). If the timing is not during the period of control signal, on the other hand (N of S50), the receiving weight vector computing unit 68, multiplier 62 and adder 64 perform adaptive array signal processing on the digital received signals 300 (S62) so as to output a composite signal 304. The switch 212 outputs the composite signal 304 as a signal processor output signal 330, and this signal processor output signal 330 is inputted to the decision unit 206 without being subjected to a phase-related processing in the multiplier 204. The decision unit 206 makes a decision on the inputted signal (S60).

According to the present embodiment, coherent detection is carried out, during a period in which signals are being received by an omnidirectional antenna, to signals which have been received by the omnidirectional antenna and signals which have been received by an adaptive array antenna, so that the both signals can be placed on the same in-phase axis and quadrature axis. Thus, those signals can be demodulated continuously even if the types of antenna differ. Moreover, in the interval of control signal, too, the omnidirectional antenna is used to receive signals irrespective of the convergence of the weighting factors. Hence, a processing delay can be made small. Furthermore, since the error tolerance in a modulation scheme used when the omnidirectional antenna is used is higher than when the adaptive array antenna is used, the degradation of signal transmission characteristics due to the omnidirectional antenna patterns can be reduced.

The present invention has been described based on the embodiments which are only exemplary. It is understood by those skilled in the art that there exist other various modifications to the combination of each component and process described above and that such modifications are encompassed by the scope of the present invention.

According to the present embodiment, the antenna selector 210 compares the received powers among a plurality of digital received signals 300 and selects a single digital received signal 300 which is to be used during an interval of control signal. However, the embodiments are not limited thereto and, for example, a digital received signal 300 which is fixed in advance may be selected. According to this modified example, the processing and circuits are further simplified. In other words, any modification may serve beneficial as long as in the interval of control signal a single digital received signal 300 is selected as one to be processed.

In the present embodiment, the receiving weight vector computing unit 68 uses an adaptive algorithm to estimate the receiving weight vector 312, and the response vector computing unit 80 uses a correlation processing to estimate the receiving response vector 312. However, a processing other than the above-mentioned may be carried out by the receiving weight vector computing unit 68 and the response vector computing unit 80. For example, only one of the adaptive algorithm and the correlation processing may be carried out at the receiving weight vector computing unit 68 and the response vector computing unit 80. In such a case, the receiving weight vector computing unit 68 and the response vector computing unit 80 may be integrally structured as a single unit. Moreover, an arrival direction estimation algorithm, such as MUSIC (MUltiple SIgnal Classification), different from the adaptive algorithm or correlation processing may be carried out by the receiving weight vector computing unit 68 or the response vector computing unit 80. According to this modified example, desired waves and undesired waves are distinguished with greater accuracy and in greater detail. That is, any such modification may serve beneficial as long as a value separable from among a plurality of received signals can be estimated in the signal processing using the adaptive array antenna.

In the present embodiment, the control unit 24 sends information, on a separation point of the interval of control signal and the interval of data signal, as a basis for switching between the omnidirectional antenna pattern and the adaptive array antenna pattern. However, the embodiments are not limited thereto and, for example, the ominidirectional antenna pattern and the adaptive array antenna pattern may be switched based on the convergence of an adaptive algorithm executed by the receiving weight vector computing unit 68. That is, the receiving weight vector computing unit 68 monitors error values derived at the time of executing an adaptive algorithm. And if the error value becomes less than a predetermined threshold value, it is regarded that the receiving weight vector 312 has converged. Then it is notified to the control unit. As a result, based on the notified timing the control unit 24 switches between the omnidirectional antenna pattern and the adaptive array antenna pattern. According to this modified example, the duration of an omnidirectional antenna pattern can be shortened. In other words, it suffices if the omnidirectional antenna pattern and the adaptive array antenna pattern are switched based on a predetermined condition or criterion.

Although the present invention has been described by way of exemplary embodiments and modified examples as above, it should be understood that many changes and substitutions may still further be made by those skilled in the art without departing from the scope of the present invention which is defined by the appended claims.

What is claimed is:

1. A receiving apparatus, comprising:
   an input unit which respectively inputs a plurality of signals;
   a weighting factor deriving unit which derives a plurality of weight factors corresponding respectively to the plurality of inputted signals, based on the plurality of signals inputted by said input unit and a reference signal;
   a carrier recovery unit which recovers, over a first predetermined period, a carrier from one of the plurality of inputted signals;
   a synthesis unit which weights and synthesizes, over a second period that follows the first period, the plurality of inputted signals by the plurality of weighting factors derived by said weighting factor deriving unit; and
   a demodulation unit which generates and outputs, during the first period, a demodulated signal by one of the plurality of inputted signals and the recovered carrier and which outputs, during the second period, the synthesized signal as a demodulated signal.

2. A receiving apparatus according to claim 1, wherein the plurality of signals inputted by said input unit are signals contained in one frame and the first period corresponds to a period started from a top of the frame.

3. A receiving apparatus according to claim 1, wherein modulation scheme differs in the first period and the second period that are to contain the plurality of signals inputted to said input unit and wherein error tolerance of modulation scheme in the first period is higher than that in the second period.

4. A receiving apparatus according to claim 2, wherein modulation scheme differs in the first period and the second period that are to contain the plurality of signals inputted to said input unit and wherein error tolerance of modulation scheme in the first period is higher than that for the second period.

5. A receiving apparatus according to claim 1, wherein the first period is a period which the plurality of weighting factors that are to be derived by said weighting factor deriving unit takes to reach a predetermined reference.

6. A receiving apparatus according to claim 2, wherein the first period is a period which the plurality of weighting factors that are to be derived by said weighting factor deriving unit takes to reach a predetermined reference.

7. A receiving method characterized in that in a first period a plurality of weighting factors are derived from a plurality of inputted signals and a reference signal, a carrier is recovered from one of the plurality of inputted signals so as to generate and output a demodulated signal from the one of the plurality of inputted signals and the recovered carrier, then in a second period that follows the first period the plurality of inputted signals are weighted respectively with the plurality of derived weighting factors and then synthesized, and the synthesized signals are outputted as demodulated signals.

8. A receiving method, comprising:
   inputting respectively a plurality of signals;
   deriving a plurality of weight factors corresponding respectively to the plurality of inputted signals, based on the plurality of inputted signals and a reference signal;
   recovering, over a first predetermined period, a carrier from one of the plurality of inputted signals;
   weighting and synthesizing, over a second period that follows the first period, the plurality of inputted signals by the plurality of derived weighting factors; and
   generating and outputting, during the first period, a demodulated signal by one of the plurality of inputted signals and the recovered carrier and outputting, during the second period, the synthesized signal as a demodulated signal.

9. A receiving method according to claim 8, wherein the plurality of inputted signals are signals contained in one frame and the first period corresponds to a period started from a top of the frame.

10. A receiving method according to claim 8, wherein modulation scheme differs in the first period and the second period that are to contain the plurality of inputted signals and wherein error tolerance of modulation scheme in the first period is higher than that in the second period.

11. A receiving method according to claim 9, wherein modulation scheme differs in the first period and the second period that are to contain the plurality of inputted signals and wherein error tolerance of modulation scheme in the first period is stronger than that in the second period.

12. A receiving method according to claim 8, wherein the first period is a period which the plurality of weighting factors that are to be derived by said deriving takes to reach a predetermined reference.

13. A receiving method according to claim 9, wherein the first period is a period which the plurality of weighting factors that are to be derived by said deriving takes to reach a predetermined reference.

14. A computer-readable recording medium which stores a program executable by a computer, the program including the functions of:
   inputting respectively a plurality of signals via a wireless network;
   deriving a plurality of weight factors corresponding respectively to the plurality of inputted signals, based on the plurality of inputted signals and a reference signal, and storing the plurality of derived weight factors in a memory;
   recovering, over a first predetermined period, a carrier from one of the plurality of inputted signals;
   weighting and synthesizing, over a second period that follows the first period, the plurality of inputted signals by the plurality of weighting factors stored in the memory; and
   generating and outputting, during the first period, a demodulated signal by one of the plurality of inputted signals and the recovered carrier and outputting, during the second period, the synthesized signal as a demodulated signal.

15. A computer-readable recording medium according to claim 14, wherein the plurality of inputted signals are signals contained in one frame and the first period corresponds to a period started from a top of the frame.

16. A computer-readable recording medium according to claim 14, wherein modulation scheme differs in the first period and the second period that are to contain the plurality of inputted signals and wherein error tolerance of modulation scheme in the first period is higher than that in the second period.

17. A computer-readable recording medium according to claim 15, wherein modulation scheme differs in the first period and the second period that are to contain the plurality of inputted signals and wherein error tolerance of modulation scheme in the first period is higher than that in the second period.

18. A computer-readable recording medium according to claim 14, wherein the first period is a period which the plurality of weighting factors that are to be derived by said deriving takes to reach a predetermined reference.

19. A computer-readable recording medium according to claim 15, wherein the first period is a period which the plurality of weighting factors that are to be derived by said deriving takes to reach a predetermined reference.

20. A receiving apparatus comprising:
   an input unit which respectively inputs a plurality of signals;
   a weighting factor deriving unit which derives a plurality of weight factors corresponding respectively to the plurality of inputted signals, based on the plurality of signals inputted by said input unit and a reference signal;
   a demodulation unit which subjects, over a first period, one of the plurality of signals inputted to a process; and
   a synthesis unit which weights and synthesizes, over a second period that follows the first period, the plurality of inputted signals by the plurality of weighting factors derived by said weighting factor deriving unit, wherein
   the demodulation unit generates and outputs, during the first period, a demodulated signal from one of the plurality of inputted signals, based on the process, and outputs, during the second period, the synthesized signal as a demodulated signal.

* * * * *